United States Patent
Park

(10) Patent No.: US 11,036,493 B2
(45) Date of Patent: Jun. 15, 2021

(54) MEMORY SYSTEM AND OPERATING METHOD THEREOF

(71) Applicant: SK hynix Inc., Gyeonggi-do (KR)

(72) Inventor: Jeen Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 139 days.

(21) Appl. No.: 16/110,462

(22) Filed: Aug. 23, 2018

(65) Prior Publication Data

US 2019/0227788 A1 Jul. 25, 2019

(30) Foreign Application Priority Data

Jan. 25, 2018 (KR) .................. 10-2018-0009574

(51) Int. Cl.
*G06F 8/654* (2018.01)
*G06F 9/4401* (2018.01)
*H04L 29/08* (2006.01)
*G06F 1/30* (2006.01)

(52) U.S. Cl.
CPC .......... *G06F 8/654* (2018.02); *G06F 9/4401* (2013.01); *G06F 1/30* (2013.01); *H04L 67/06* (2013.01)

(58) Field of Classification Search
CPC . G06F 8/654; G06F 8/65; G06F 8/665; G06F 8/71; G06F 9/4401; G06F 3/0619; G06F 3/0632; G06F 3/0679; G06F 1/28; G06F 1/30; G06F 11/1417; G06F 11/1433; G06F 12/0238; G06F 12/0246; G06F 12/0661; G06F 12/0676; H04L 67/06; H04L 67/34; H04L 9/3234; H04L 9/3242; H04L 9/3268

USPC ....................................................... 717/168
See application file for complete search history.

(56) References Cited

U.S. PATENT DOCUMENTS

| | | | |
|---|---|---|---|
| 2005/0251672 A1* | 11/2005 | Kim ................... | G06F 11/1417 713/1 |
| 2010/0114983 A1* | 5/2010 | Robert et al. .......... | H04L 67/06 707/803 |
| 2014/0028200 A1* | 1/2014 | Van Wagoner et al. ..................... | G06F 8/65 717/171 |
| 2016/0267003 A1* | 9/2016 | Morio | |
| 2017/0249155 A1* | 8/2017 | Sundrani et al. ..... | G06F 9/4401 |

(Continued)

FOREIGN PATENT DOCUMENTS

KR 1020050065632 6/2005

*Primary Examiner* — Wei Y Zhen
*Assistant Examiner* — Mohammed N Huda
(74) *Attorney, Agent, or Firm* — IP & T Group LLP

(57) ABSTRACT

A memory system may include: a nonvolatile memory device including a system region for storing lifespan information of a plurality of memory blocks and an one-Time Programmable (OTP) region which is not reset when firmware is upgraded; a function component configured to store the firmware; an interface configured to receive new firmware for upgrade; a validation control component configured to perform a validation operation of the nonvolatile memory device; and an upgrade component configured to upgrade the firmware when the validation operation of the nonvolatile memory device is performed, wherein the validation control component selects at least one backup block by referring to the OTP region, backs up the lifespan information to the at least one backup block, and then controls the upgrade component to upgrade the firmware.

13 Claims, 8 Drawing Sheets

(56) References Cited

U.S. PATENT DOCUMENTS

2018/0004506 A1* 1/2018 Annapureddy et al. ..................... G06F 8/654
2018/0091315 A1* 3/2018 Singhal et al. ......... G06F 8/654
2018/0357165 A1* 12/2018 Helmick etal.

* cited by examiner

FIG.2

Firmware Update

| Block Offset | Program/Erase Cycle |
|---|---|
| 0(Blk0) | 100 |
| 1(Blk1) | 20 |
| 2(Blk2) | 140 |
| ⋮ | ⋮ |
| n(Blk(n)) | 80 |

⇒

| Block Offset | Program/Erase Cycle |
|---|---|
| 0(Blk0) | 0 |
| 1(Blk1) | 0 |
| 2(Blk2) | 0 |
| ⋮ | ⋮ |
| n(Blk(n)) | 0 |

FIG.3

Start
↓
Select backup block to store lifespan information of nonvolatile memory device — S200
↓
Back up lifespan information stored in system region of nonvolatile memory device to backup block — S300
↓
Upgrade firmware using new firmware — S400
↓
End

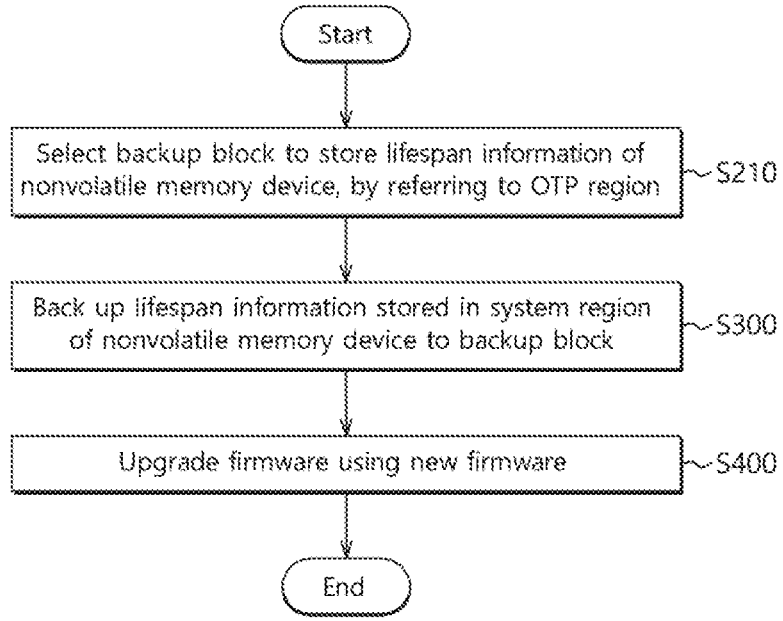
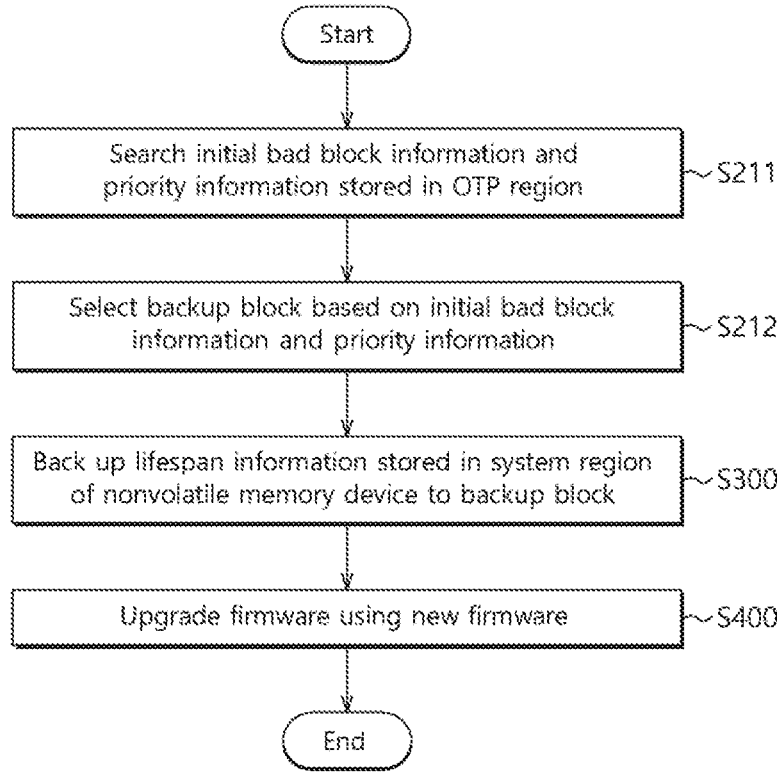

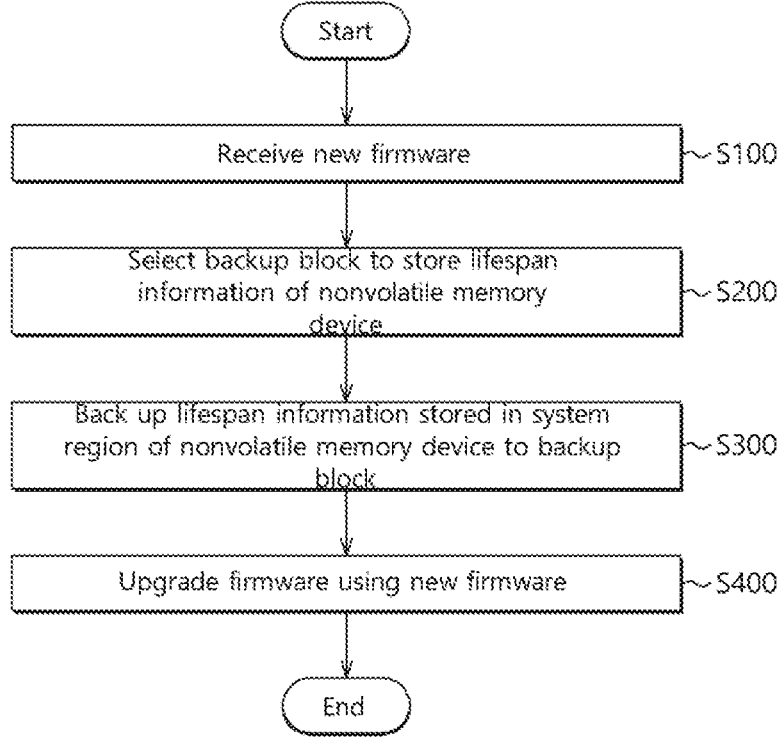
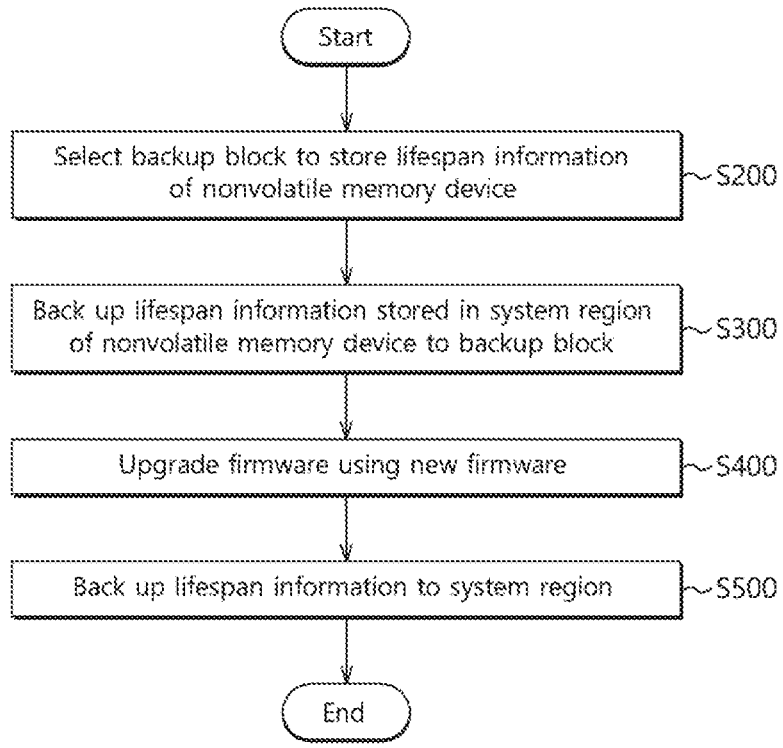

MEMORY SYSTEM AND OPERATING METHOD THEREOF

CROSS-REFERENCE TO RELATED APPLICATION

The present application claims priority under 35 U.S.C. § 119(a) to Korean patent application number 10-2018-0009574, filed on Jan. 25, 2018, in the Korean Intellectual Property Office, which is incorporated herein by reference in its entirety.

BACKGROUND

1. Technical Field

Various embodiments generally relate to a memory system, and more particularly, to a memory system including a nonvolatile memory device.

2. Related Art

A memory system may be configured to store data provided from an external device in response to a write request of the external device. Furthermore, the memory system may be configured to provide data stored therein to the external device in response to a read request of the external device. The external device may include an electronic device which can process data, for example, a computer, digital camera and mobile phone. The memory system may be embedded in the external device, or separately fabricated and coupled to the external device.

Since the memory system using a memory device has no mechanical driver, the memory system has excellent stability and durability, exhibits high information access speed, and has low power consumption. A memory system having such advantages may include a universal serial bus (USB) memory device, a memory card having various interfaces, a universal flash storage (UFS) device, and a solid state drive (SSD).

SUMMARY

Various embodiments are directed to a memory system capable of backing up lifespan information of a nonvolatile memory device when firmware is upgraded, thereby preventing a reset of the lifespan information.

In an embodiment, a memory system may include: a nonvolatile memory device including a system region for storing lifespan information of a plurality of memory blocks and an one-Time Programmable (OTP) region which is not reset when firmware is upgraded; a function component configured to store the firmware; an interface configured to receive new firmware for upgrade; a validation control component configured to perform a validation operation of the nonvolatile memory device; and an upgrade component configured to upgrade the firmware when the validation operation of the nonvolatile memory device is performed, wherein the validation control component selects at least one backup block by referring to the OTP region, backs up the lifespan information to the at least one backup block, and then controls the upgrade component to upgrade the firmware.

In an embodiment, an operating method of a memory system may include the steps of: selecting, by a controller, at least one backup block among blocks of a nonvolatile memory device; backing up, by the controller, lifespan information to the at least one backup block, the lifespan information being stored in a system region of a nonvolatile memory device; and upgrading, by the controller, firmware using new firmware.

In an embodiment, a memory system may include: a nonvolatile memory device including a plurality of memory blocks, a first region for storing lifespan information of the plurality of memory blocks and a second region for storing initial bad block information regarding initial bad blocks among the plurality of memory blocks; and a controller configured to: when new firmware for upgrade is received, select an initial bad block among the initial bad blocks based on the initial bad block information; back up the lifespan information to the initial bad block; and upgrade firmware using the new firmware.

BRIEF DESCRIPTION OF THE DRAWINGS

FIG. 2 illustrates a process of resetting lifespan information of a nonvolatile memory device when firmware is upgraded according to an embodiment of the present disclosure.

FIGS. 3 to 7 are flowcharts illustrating operations of a memory system according to embodiments of the present disclosure.

DETAILED DESCRIPTION

Figure 1:
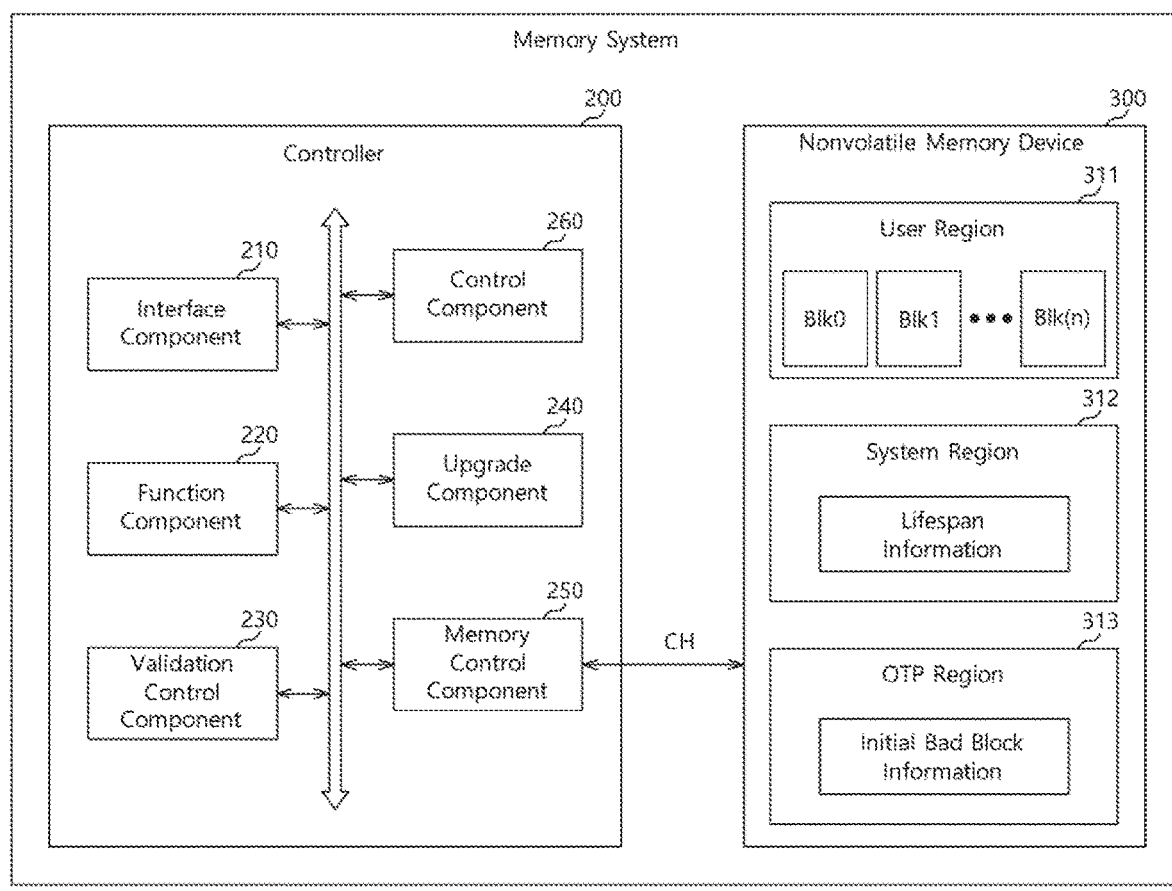
FIG. 1 is a block diagram illustrating a memory system according to an embodiment of the present disclosure.

Advantages and characteristics of the present disclosure and a method for achieving the same are described through the following embodiments with reference to the accompanying drawings. However, the present disclosure is not limited to the embodiments described here, but may include other, different embodiments, which may be variations or modifications of one or more disclosed embodiments. The present embodiments are provided to describe aspects and features of the present disclosure to enable those skilled in the art to which the present disclosure pertains to practice the present invention.

Elements and components are not limited to specific shapes illustrated in the drawings; such shapes may be exaggerated or otherwise rendered for clarity. In this specification, specific terms are used to describe the present disclosure; however, such terms are not intended to limit the scope of the present disclosure or the claims.

In this specification, an expression such as 'and/or' may indicate inclusion of one or more components listed before/after the expression. Moreover, an expression such as 'connected/coupled' may indicate that one element is directly connected to another element or indirectly connected through another element. A singular form may include its plural form and vice versa, unless the context indicates otherwise. Furthermore, the meanings of 'include' and 'comprise' or 'including' and 'comprising' may specify the presence or addition of the stated component(s), step(s), operation(s) and/or element(s), but do not exclude the presence or addition of one or more other components, steps, operations and/or elements. Also, throughout the specification, reference to "an embodiment" or the like is not necessarily to only one embodiment, and different references to "an embodiment" or the like are not necessarily to the same embodiment(s).

Various embodiments will be described in detail with reference to the accompanying drawings.

FIG. 1 is a block diagram illustrating a memory system 100 in accordance with an embodiment. A configuration of the memory system 100 is described with reference to FIG. 1.

The memory system 100 may store data which are accessed by a host device (not shown) such as a mobile phone, MP3 player, laptop computer, desktop computer, game machine, television (TV) or in-vehicle infotainment system.

The memory system 100 may be configured as any one of various storage devices, depending on a host interface indicating a transmission protocol with the host device. For example, the memory system 100 may be implemented with any one of various storage devices such as a solid state drive (SSD), a multi-media card (e.g., MMC, eMMC, RS-MMC or micro-MMC), a secure digital card (e.g., SD, mini-SD or micro-SD), a universal storage bus (USB) storage device, a universal flash storage (UFS) device, a personal computer memory card international association (PCMCIA) card-type storage device, a peripheral component interconnection (PCI) card-type storage device, a PCI express (PCI-e or PCIe) card-type storage device, a compact flash (CF) card, and a smart media card and a memory stick.

The memory system 100 may be fabricated as any one of various types of packages such as a package on package (POP), a system on chip (SOC), a multi-chip package (MCP), a chip on board (COB), a wafer-level fabricated package (WFP) and a wafer-level stack package (WSP).

The memory system 100 may include a controller 200 and a nonvolatile memory device 300. The controller 200 may include an interface 210, a function component 220, a validation control component 230, an upgrade component 240 and a memory control component 250.

In a test process, carried out after the nonvolatile memory device 300 is fabricated, the nonvolatile memory device 300 may be used for testing firmware (FW). For example, data write, read and erase operations for the nonvolatile memory device 300 may be repeatedly tested in a validation operation for validating the reliability of the memory system 100. The nonvolatile memory device 300 may be repeatedly used to test various firmware. In the present specification, "upgrade" of firmware may indicate applying new firmware or reapplying the same firmware while resetting data stored in the nonvolatile memory device 300.

The interface 210 may receive new firmware which is to be applied when firmware is upgraded. The new firmware may be received from a test device or host device.

The function component 220 may perform a preset function. For example, the function component 220 may store firmware, and perform the preset operation using the stored firmware. The preset operation may include a data storage operation, a data processing operation and a data output operation. When the function component 220 has firmware, it may be embodied within the memory system 100. The memory system 100 may include a plurality of function components 220.

The validation control component 230 may control an operation of upgrading the firmware stored in the function component 220, using the new firmware received by the interface 210. Furthermore, the validation control component 230 may control a validation operation in a test process of the nonvolatile memory device 300, for example, a data write, read or erase operation.

The upgrade component 240 may upgrade the firmware of the function component 220. When the interface 210 receives new firmware, the upgrade component 240 may perform a firmware upgrade operation using the new firmware, based on control of the validation control component 230.

The memory control component 250 may control the nonvolatile memory device 300 according to control of a control component 260. The memory control component 250 may also be referred to as a memory interface. The memory control component 250 may provide control signals to the nonvolatile memory device 300. The control signals may include a command, address and control signal for controlling the nonvolatile memory device 300. The memory control component 250 may provide data to the nonvolatile memory device 300, or receive data from the nonvolatile memory device 300. At a test process of the nonvolatile memory device 300, data may be transferred to the nonvolatile memory device 300 through the memory control component 250, such that a validation operation is performed by the validation control component 230.

The control component 260 may include a micro control unit (MCU) or a central processing unit (CPU). The control component 260 may process a request received from the host device. In order to process the request, the control component 260 may drive a code-based instruction or algorithm loaded to a random access memory (RAM), i.e., firmware (FW), and control internal function blocks and the nonvolatile memory device 300.

The control component 260 may store data in a memory cell array of the nonvolatile memory device 300, or update the stored data. Furthermore, the control component 260 may count the number of times that the memory cells of the nonvolatile memory device 300 are updated, and perform a memory block change operation when the cumulative update count exceeds a threshold value. The control component 260 may include a counter circuit for counting the number of times that the memory cells of the nonvolatile memory device 300 are updated. The memory block change operation may be performed in a block or page basis. The number of times that the memory cells are updated may indicate a program/cycle count. The control component 260 may store information on the update count into a system region 312 of the nonvolatile memory device 300.

The RAM (not illustrated) may include a dynamic RAM (DRAM) or static RAM (SRAM). The RAM may store firmware driven by the control component 260. Furthermore, the RAM may store data required for driving firmware, for example, meta data. That is, the RAM may operate as a working memory of the control component 260.

The host interface (not illustrated) may interface the host device and the memory system 100. For example, the host interface may communicate with the host device using any one of standard transmission protocols. The standard transmission protocols may include secure digital, Universal Serial Bus (USB), Multi-Media Card (MMC), Embedded MMC (eMMC), Personal Computer Memory Card International Association (PCMCIA), Parallel Advanced Technology Attachment (PATA), Serial Advanced Technology Attachment (SATA), Small Computer System Interface (SCSI), Serial Attached SCSI (SAS), Peripheral Component Interconnection (PCI), PCI Express (PCI-e or PCIe) and Universal Flash Storage (UFS).

The nonvolatile memory device 300 may be implemented with any one of various nonvolatile memory devices including a NAND flash memory device, a NOR flash memory device, a ferroelectric RAM (FRAM) using a ferroelectric capacitor, a magnetic RAM (MRAM) using a tunneling magneto-resistive (TMR) film, a phase change RAM (PRAM) using chalcogenide alloys, and a resistive RAM (ReRAM) using a transition metal oxide.

The nonvolatile memory device 300 may include a memory cell array. The memory cells in the memory cell array may be configured on a basis of memory cell groups, from the operational viewpoint or physical (or structural) viewpoint. For example, memory cells which are coupled to the same word line, and read or written (or programmed) at the same time may be configured as a page. Hereafter, memory cells configured as a page will be referred to as a "page", for convenience. Furthermore, memory cells which are erased at the same time may be configured as a memory block. The memory cell array may include a plurality of memory blocks, and each of the memory blocks may include a plurality of pages.

The memory cell array may include a plurality of memory blocks. The plurality of memory blocks may be divided into a user region 311, a system region 312 and a one-time programmable (OTP) region 313, depending on the usage of the memory blocks.

In an embodiment, the user region 311 may include a plurality of blocks Blk0 to Blk(n). The plurality of blocks Blk0 to Blk(n) of the user region 311 may store data based on a write request received from the host device. Furthermore, at a test process of the nonvolatile memory device 300, data may be written, read or erased according to a request of the host device or the test device.

In an embodiment, the system region 312 may include a plurality of blocks (not illustrated) to store lifespan information of the nonvolatile memory device 300. For example, program/erase (P/E) cycle information may be stored in the system region 312 of the memory cell array. The controller 200 may store system information in the system region 312 of the nonvolatile memory device 300, or update the system information stored in the system region 312. The controller 200 may change a memory block to store the system information, based on the number of times that the system information is updated. Alternatively, the controller 200 may control the nonvolatile memory device 300 to perform a system block change operation of changing the storage position of the system information within a memory block having the system information stored therein. Hereafter, the memory block having the system information stored therein will be referred to as a system block.

The controller 200 may count the number of times that the memory cells of the system block are updated, and perform the system block change operation when the cumulative update count exceeds the threshold value. The controller 200 may include a counter circuit (not illustrated) for counting the number of times that the memory cells of the system block are updated. The system block change operation may be performed in a block or page basis.

In an embodiment, the OTP region 313 may include a plurality of blocks (not illustrated), and indicate a region in which data cannot be additionally recorded, once data are programmed. The OTP region 313 may be recorded through an operation of setting a memory using an OTP command. The size and position of the OTP region 313 is not limited to the present embodiment. In an embodiment, the initial bad block information of the nonvolatile memory device 300 may be stored in the OTP region 313.

A NAND flash memory may have a bad block therein, unlike a NOR flash memory. The bad block may be a block, among blocks of the memory, in which data cannot be recorded, because the lifespan of the block came to an end. Data stored in a bad block are highly likely to be damaged. Therefore, the memory system 100 needs to store the data in another block in order to avoid the bad block.

The bad block may be divided into a run time bad block (RTBB) and an initial bad block (IBB). The initial bad block may indicate a bad block which occurs when the nonvolatile memory device 300 is initially fabricated, whereas the run time bad block may indicate a bad block which occurs while the nonvolatile memory device 300 is used. In order to prevent a data damage caused by the bad block, the controller 200 may use a separate bad block detection method. For example, when a write operation is performed on blocks constituting the main region of the nonvolatile memory device 300, the controller 200 may record error correction code (ECC) values generated from data of the respective blocks into a spare region of the nonvolatile memory device 300. When a read operation is performed on a certain block of the main region of the nonvolatile memory device 300, the controller 200 may generate a new ECC value from data of the block. Then, the controller 200 may compare the ECC value of the block stored in the spare region to the new ECC value. That is, the controller 200 may compare the new ECC value to the ECC value stored in the spare region to check whether an error occurred in the data. When the comparison result indicates that an error occurred, the controller 200 may recognize the memory block having the data stored there as a bad block. Otherwise, the controller 200 may recognize the memory block as a normal block.

FIG. 2 illustrates a process of resetting lifespan information of a nonvolatile memory device when firmware is upgraded. For example, suppose that the program/erase (P/E) cycles of blocks having block offsets of 0, 1, 2 and n, i.e., blocks Blk0, Blk1, Blk2 and Blkn are 100, 20, 140 and 80, respectively, when the firmware is upgraded.

Referring to FIGS. 1 and 2, when the firmware stored in the function component 220 is upgraded to new firmware or reinstalled, data stored in the blocks in the user region 311 and the system region 312 of the nonvolatile memory device 300 may be reset. Although FIG. 2 illustrates the process of resetting the program/erase cycle information, the data stored in the user region 311 and the system region 312 may be reset. Such data may include the user data and the lifespan information containing the program/erase cycle information.

As illustrated in FIG. 2, the program/erase cycles of the blocks Blk0, Blk1, Blk2 and Blk(n) may be all reset to 0, even though the program/erase cycles have different values. Then, the number of times that data are programmed or erased will be counted. For example, the lifespan information may be in the form of information on the program/erase (P/E) cycle count. However, the present embodiment is not limited thereto; other information related to the lifespan of the system, such as a read count, may be used instead or in addition to the P/E cycle count.

When the lifespan information stored in the system region 312 of the nonvolatile memory device 300 is reset by the upgrade or reinstallation of the firmware, it is difficult to determine the cause of an error which occurs in the nonvolatile memory device 300 after the reset operation. For example, when an error occurs in a specific block of the nonvolatile memory device 300 after the upgrade of the firmware, it is difficult to determine whether the error occurred due to deterioration caused by an accumulation of program/erase cycles of the specific block, or the error occurred due to another defect of the nonvolatile memory device 300. Furthermore, since the lifespan of the nonvolatile memory device 300 for a test cannot be determined during a test, the reliability of the firmware validation may decrease.

FIGS. 3 to 7 are flowcharts illustrating operations of a memory system in accordance with embodiments. Such operations may be performed by the memory system 100 of FIG. 1.

Referring again to FIG. 1, the memory system 100 may include the controller 200 and the nonvolatile memory device 300. The nonvolatile memory device 300 may include the system region 312 for storing the lifespan information of the plurality of memory blocks and the GTP region 313 which is not reset when firmware is upgraded. The controller 200 may include the interface 210, the function component 220, the validation control component 230 and the upgrade component 240. The function component 220 may store the firmware. The interface 210 may receive new firmware for an upgrade. The validation control component 230 may perform a validation operation of the nonvolatile memory device 300. The upgrade component 240 may upgrade the firmware when the validation operation of the nonvolatile memory device 300 is performed. The validation control component 230 may select a backup block by referring to the OTP region 313, back up the lifespan information to the backup block, and then upgrade the firmware.

Referring to FIG. 3, an operating method of the memory system 100 of FIG. 1 in accordance with an embodiment may include steps S200, S300 and S400. At the step S200, the controller 200 may select a backup block to store the lifespan information of the nonvolatile information device 300. At the step S300, the controller 200 may back up the lifespan information stored in the system region 312 of the nonvolatile memory device 300 to the backup block. At the step S400, the controller 200 may upgrade firmware using new firmware. That is, the backup block may be selected by the validation control component 230, the lifespan information may be backed up to the backup block, and the upgrade component 240 may upgrade the firmware using the new firmware according to control of the validation control component 230.

In various embodiments, the backup block may be a block which is not reset when the firmware is upgraded. When the firmware is upgraded after the lifespan information of the memory blocks was stored in the backup block, the lifespan information may not be reset but stored. Therefore, when an error occurred in a memory block of the nonvolatile memory device 300 after the firmware was upgraded, the validation control component 230 may easily determine whether the error occurred due to a deterioration caused by cumulative usage or another cause.

Referring to FIGS. 3 and 4, in the step S200, the controller 200 may select the backup block to store the lifespan information of the nonvolatile memory device 300. At the step S210, the controller 200 may select the backup block by referring to the OTP region 313, which may not be reset when the firmware is upgraded.

In an embodiment, the step S210 may include searching initial bad block information stored in the OTP region 313 and determining the backup block to store the lifespan information of the nonvolatile memory device 300 based on the initial bad block information. In an embodiment, the initial bad block information may be stored in the OTP region 313, and one or more of the initial bad blocks may be selected as the backup block. That is, the lifespan information may be stored in one or more of the initial bad blocks according to control of the validation control component 230. The initial bad block information may indicate which memory blocks are initial bad blocks. In an embodiment, when the initial bad block information stored in the OTP region 313 includes a plurality of initial bad blocks, the order of the initial bad blocks selected as the backup blocks may be set in advance. Based on the order, the initial bad blocks may be selected as the backup blocks according to control of the validation control component 230. A plurality of initial bad blocks may be selected as the backup blocks. That is, two or more initial bad blocks may be selected as the backup blocks, and the same lifespan information may be stored in the plurality of backup blocks. Since the lifespan information is stored in the plurality of backup blocks, a loss of the lifespan information may be prevented, which makes it possible to easily determine the cause of an error in the nonvolatile memory device 300. As a result, the reliability of the memory system 100 may be improved.

Referring to FIGS. 3 and 5, in the step S200, the controller 200 may select the backup block to store the lifespan information of the nonvolatile memory device 300. At the step S211, the controller 200 may search the initial bad block information stored in the OTP region 313 and priority information of the initial bad blocks. At the step S212, the controller 200 may select the backup block based on the initial bad block information and the priority information. That is, the priority information of the initial bad blocks may be stored in the OTP region 313 of the nonvolatile memory device 300. The priority information may include information on the priority of the initial bad block selected as the backup block before the firmware is upgraded. Therefore, before the firmware upgrade operation is performed, the controller 200 may search the initial bad block information and the priority information stored in the OTP region 313, and select the backup block based on the search result. In an embodiment, the priority information may include information regarding the number of times that the initial bad block is selected as the backup block. That is, when the same initial bad block was selected as the backup block a preset number of times, another initial bad block may be selected as a subsequent backup block.

Referring to FIGS. 3 and 6, an operating method of the memory system 100 may further include the step S100, which may be performed before the step S200. At the step S100, the controller 200 may receive new firmware. In various embodiments, the controller 200 may receive new firmware through the interface 210, and the upgrade component 240 may upgrade the firmware based on the new firmware.

Referring to FIGS. 3 and 7, an operating method of the memory system 100 may further include the step S500, which may be performed after the step S400. At the step S500, the controller 200 may back up the lifespan information to the system region 312 after the firmware was upgraded. That is, after the firmware was upgraded, changed lifespan information may not be stored in the backup block having the lifespan information stored therein. The changed lifespan information may be stored in the system region 312 after the existing lifespan information is backed up to the memory block of the system region 312. The lifespan information may be backed up to the memory block in which the lifespan information had been stored before the upgrade of the firmware, and the changed backup information may be subsequently stored. In an embodiment, the lifespan information may be backed up to a memory block other than the memory block in which the lifespan information had been stored before the upgrade of the firmware, and the changed lifespan information may be stored in a new memory block.

In an embodiment, when the initial bad block is selected as the backup block, the lifespan information is highly likely to be unstably retained. Thus, the lifespan information stored in the backup block may be backed up to the system region 312 after the upgrade of the firmware, and the changed lifespan information may be stored in the system region 312, which makes it possible to improve the reliability of the system.

In an embodiment, header information indicating that the lifespan information is valid information may be stored in the backup block with the lifespan information. Furthermore, the number of times that the firmware is upgraded, that is, information regarding a firmware upgrade count may be stored in the backup block with the lifespan information.

In accordance with embodiments, the memory system may back up the lifespan information of the nonvolatile memory device before the firmware is upgraded, thereby acquiring correct lifespan information during the validation process.

Figure 8:
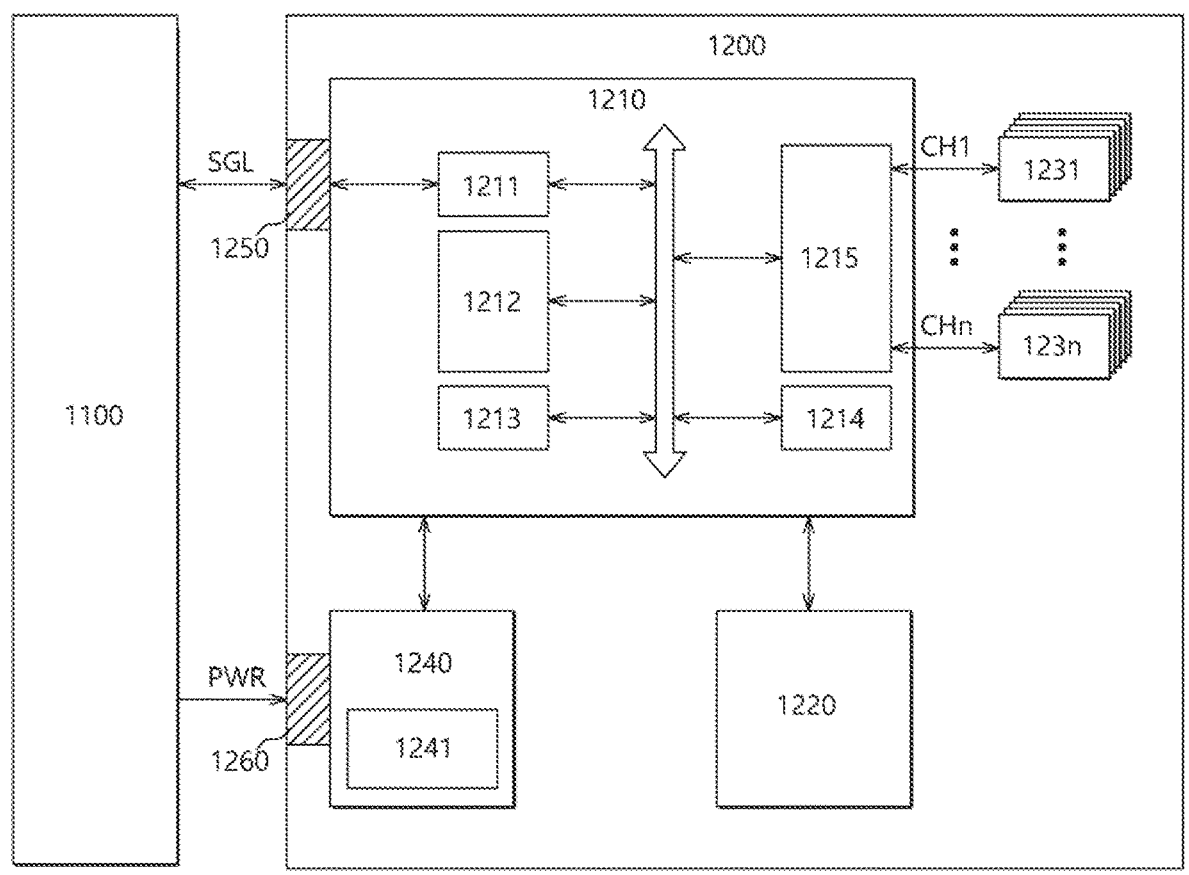
FIG. 8 is a diagram illustrating a data processing system including a solid state drive (SSD) according to an embodiment of the present disclosure.

FIG. 8 is a diagram illustrating a data processing system 1000 in accordance with an embodiment. Referring to FIG. 8, the data processing system 1000 may include a host device 1100 and a solid state drive (SSD) 1200.

The SSD 1200 may include a controller 1210, a buffer memory device 1220, nonvolatile memory devices 1231 to 123n, a power supply 1240, a signal connector 1250, and a power connector 1260.

The controller 1210 may control general operations of the SSD 1200. The controller 1210 may include a host interface 1211, a control component 1212, a random access memory 1213, an error correction code (ECC) component 1214, and a memory interface 1215.

The host interface 1211 may exchange a signal SGL with the host device 1100 through the signal connector 1250. The signal SGL may include a command, an address, data, and the like. The host interface 1211 may interface the host device 1100 and the SSD 1200 according to the protocol of the host device 1100. For example, the host interface 1211 may communicate with the host device 1100 through any one of standard interface protocols such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI express (PCI-e or PCIe) and universal flash storage (UFS).

The control component 1212 may analyze and process a signal SGL inputted from the host device 1100. The control component 1212 may control operations of internal function blocks according to firmware or software for driving the SSD 1200. The random access memory 1213 may be used as a working memory for driving such firmware or software.

The ECC component 1214 may generate the parity data of data to be transmitted to the nonvolatile memory devices 1231 to 123n. The generated parity data may be stored together with the data in the nonvolatile memory devices 1231 to 123n. The ECC component 1214 may detect an error of the data read out from the nonvolatile memory devices 1231 to 123n, based on the parity data. If a detected error is within a correctable range, the ECC component 1214 may correct the detected error.

The memory interface 1215 may provide control signals such as commands and addresses to the nonvolatile memory devices 1231 to 123n, according to control of the control component 1212. Moreover, the memory interface 1215 may exchange data with the nonvolatile memory devices 1231 to 123n, according to control of the control component 1212. For example, the memory interface 1215 may provide the data stored in the buffer memory device 1220, to the nonvolatile memory devices 1231 to 123n, or provide the data read out from the nonvolatile memory devices 1231 to 123n, to the buffer memory device 1220.

The buffer memory device 1220 may temporarily store data to be stored in the nonvolatile memory devices 1231 to 123n. Further, the buffer memory device 1220 may temporarily store the data read out from the nonvolatile memory devices 1231 to 123n. The data temporarily stored in the buffer memory device 1220 may be transmitted to the host device 1100 or the nonvolatile memory devices 1231 to 123n according to control of the controller 1210.

The nonvolatile memory devices 1231 to 123n may be used as storage media of the SSD 1200. The nonvolatile memory devices 1231 to 123n may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus.

The power supply 1240 may provide power PWR inputted through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include at least one capacitor having large capacity.

The signal connector 1250 may be implemented by various types of connectors depending on an interface scheme between the host device 1100 and the SSD 1200.

The power connector 1260 may be implemented by various types of connectors depending on a power supply scheme of the host device 1100.

Figure 9:
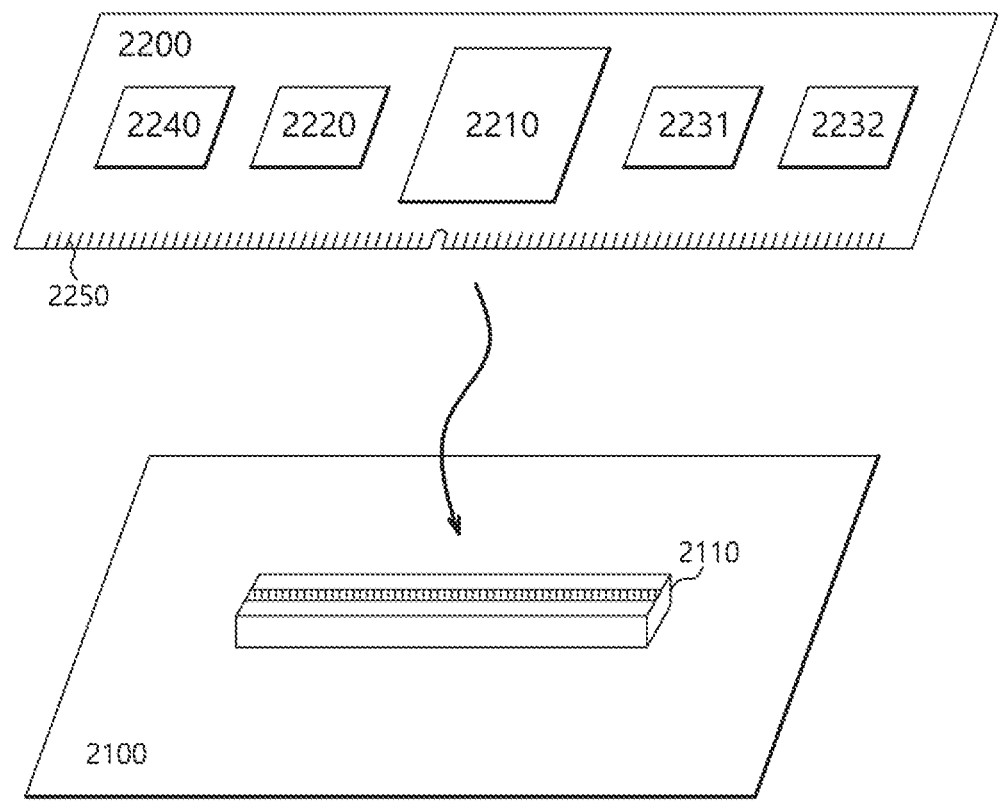
FIG. 9 is a diagram illustrating a data processing system including a memory system according to an embodiment of the present disclosure.

FIG. 9 is a diagram illustrating a data processing system 2000 in accordance with an embodiment. Referring to FIG. 9, the data processing system 2000 may include a host device 2100 and a memory system 2200.

The host device 2100 may be implemented in the form of a board such as a printed circuit board. Although not shown, the host device 2100 may include internal function blocks for performing various functions.

The host device 2100 may include a connection terminal 2110 such as a socket, a slot or a connector. The memory system 2200 may be mounted to the connection terminal 2110.

The memory system 2200 may be implemented in the form of a board such as a printed circuit board. The memory system 2200 may be referred to as a memory module or a memory card. The memory system 2200 may include a controller 2210, a buffer memory device 2220, nonvolatile memory devices 2231 and 2232, a power management integrated circuit (PMIC) 2240, and a connection terminal 2250.

The controller 2210 may control the general operations of the memory system 2200. The controller 2210 may be implemented in the same manner as the controller 1210 shown in FIG. 8.

The buffer memory device 2220 may temporarily store data to be stored in the nonvolatile memory devices 2231 and 2232. Further, the buffer memory device 2220 may temporarily store the data read from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as the storage media of the memory system 2200.

The PMIC 2240 may provide the power inputted through the connection terminal 2250, to the inside of the memory system 2200. The PMIC 2240 may manage the power of the memory system 2200 according to control of the controller 2210.

The connection terminal 2250 may be coupled to the connection terminal 2110 of the host device 2100. Through the connection terminal 2250, signals such as commands, addresses, data and so forth and power may be transferred between the host device 2100 and the memory system 2200. The connection terminal 2250 may be constructed into various types depending on an interface scheme between the host device 2100 and the memory system 2200. The connection terminal 2250 may be disposed on any one side of the memory system 2200.

Figure 10:
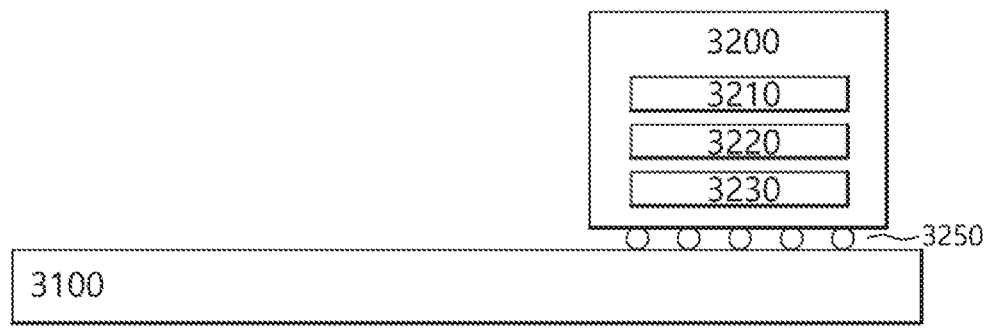
FIG. 10 is a diagram illustrating a data processing system including a memory system according to an embodiment of the present disclosure.

FIG. 10 is a diagram illustrating a data processing system 3000 in accordance with an embodiment. Referring to FIG. 10, the data processing system 3000 may include a host device 3100 and a memory system 3200.

The host device 3100 may be implemented in the form of a board such as a printed circuit board. Although not shown, the host device 3100 may include internal function blocks for performing suitable functions.

The memory system 3200 may be implemented in the form of a surface-mounting type package. The memory system 3200 may be mounted to the host device 3100 through solder balls 3250. The memory system 3200 may include a controller 3210, a buffer memory device 3220, and a nonvolatile memory device 3230.

The controller 3210 may control the general operations of the memory system 3200. The controller 3210 may be configured in the same manner as the controller 1210 shown in FIG. 8.

The buffer memory device 3220 may temporarily store data to be stored in the nonvolatile memory device 3230. Further, the buffer memory device 3220 may temporarily store the data read out from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as the storage medium of the memory system 3200.

Figure 11:
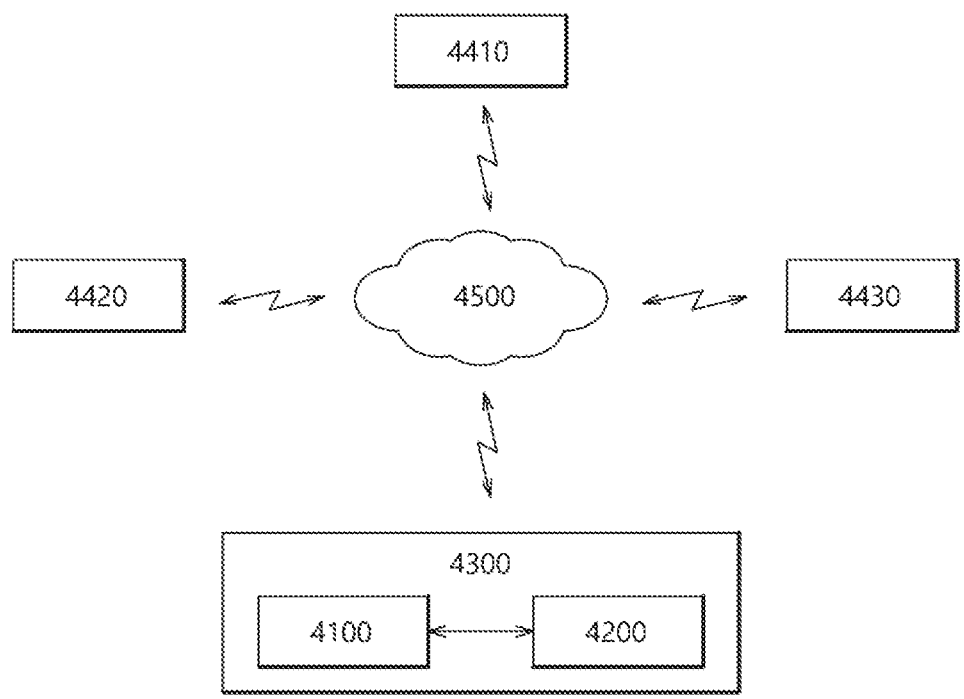
FIG. 11 is a diagram illustrating a network system including a memory system according to an embodiment of the present disclosure.

FIG. 11 is a diagram illustrating a network system 4000 in accordance with an embodiment. Referring to FIG. 11, the network system 4000 may include a server system 4300 and a plurality of client systems 4410 to 4430 which are coupled through a network 4500.

The server system 4300 may service data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and the memory system 4200. The memory system 4200 may be implemented by the memory system 100 of FIG. 1, the SSD 1200 of FIG. 8, the memory system 2200 of FIG. 9 or the memory system 3200 of FIG. 10.

Figure 12:
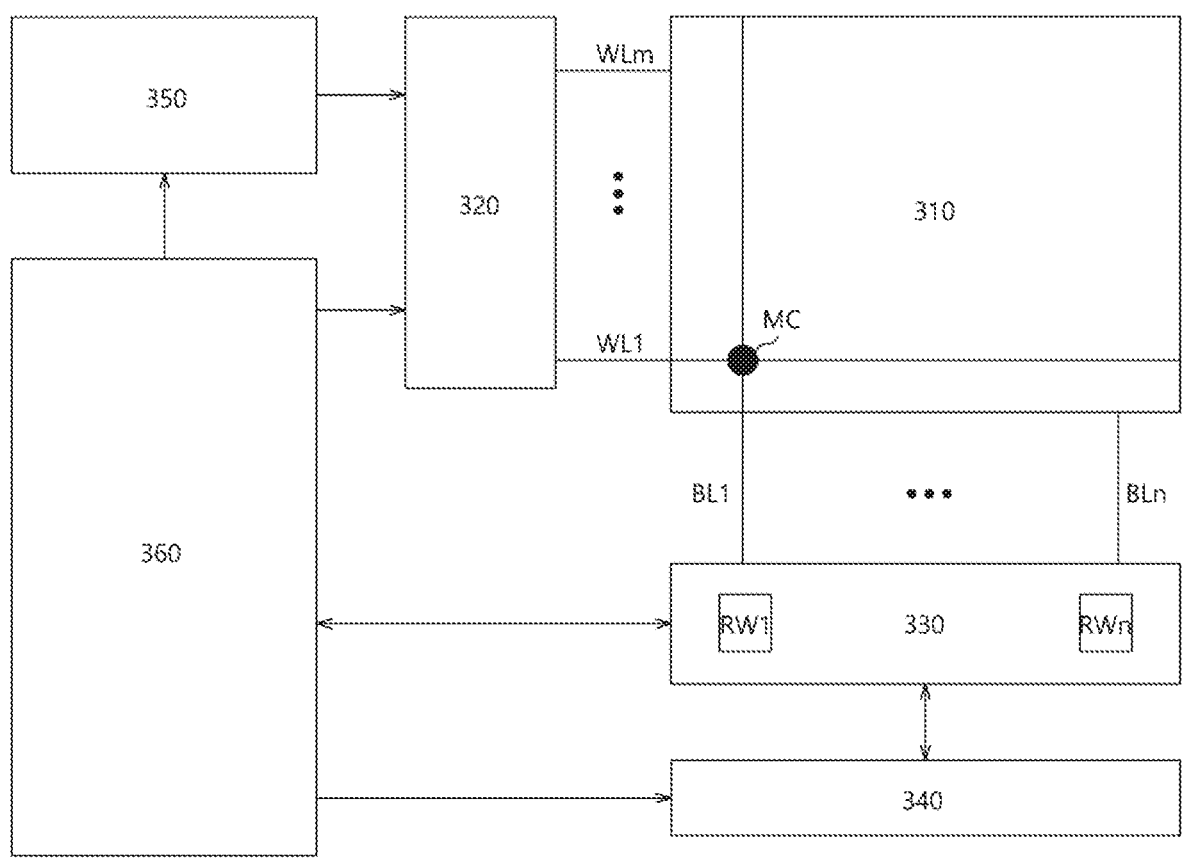
FIG. 12 is a block diagram illustrating a nonvolatile memory device included in a memory system according to an embodiment of the present disclosure.

FIG. 12 is a block diagram illustrating a nonvolatile memory device 300 in a memory system in accordance with an embodiment. Referring to FIG. 12, the nonvolatile memory device 300 may include a memory cell array 310, a row decoder 320, a data read and write (read/write) block 330, a column decoder 340, a voltage generator 350, and a control logic 360.

The memory cell array 310 may include memory cells MC which are arranged at areas where word lines WL1 to WLm and bit lines BL1 to BLn intersect with each other.

The row decoder 320 may be coupled with the memory cell array 310 through the word lines WL1 to WLm. The row decoder 320 may operate according to the control of the control logic 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver which stores data provided from the external device, in the memory cell array 310 in a write operation. For another example, the data read/write block 330 may operate as a sense amplifier which reads out data from the memory cell array 310 in a read operation.

The column decoder 340 may operate according to the control of the control logic 360. The column decoder 340 may decode an address provided from the external device. The column decoder 340 may couple the read/write circuits RW1 to RWn of the data read/write block 330 respectively corresponding to the bit lines BL1 to BLn with data input/output lines (or data input/output buffers), based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For still another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided from the external device. For example, the control logic 360 may control the read, write and erase operations of the nonvolatile memory device 300.

The functionality of the above-described systems may be implemented as methods in accordance with embodiments of the present disclosure.

While various embodiments have been described above, it will be understood to those skilled in the art in light of the present disclosure that the described embodiments may be varied or modified in many ways. Accordingly, the present invention encompasses all such variations and modifications that fall within the scope of the claims.

What is claimed is:

1. A memory system comprising:
a nonvolatile memory device comprising a system region for storing lifespan information of a plurality of memory blocks and an one-time programmable (OTP) region which is not reset when firmware is upgraded, the OTP region storing a location of an initial bad block causing errors in data stored therein;
a function component configured to store the firmware;
an interface configured to receive new firmware for upgrade;
a validation control component configured to perform a validation operation of the nonvolatile memory device; and
an upgrade component configured to upgrade the firmware when the validation operation of the nonvolatile memory device is performed,
wherein the validation control component identifies the location of the initial bad block stored in the OTP region after the interface receives the new firmware, copies the lifespan information from the system region to the initial bad block at the identified location, controls the upgrade component to upgrade the firmware after copying the lifespan information, and copies the lifespan information from the initial bad block to the system region after the upgrade,
wherein the system region is reset by the upgrade, and the initial bad block and OTP region are not reset by the upgrade.

2. The memory system of claim 1, wherein the validation control component selects the initial bad block from among initial bad blocks based on priority information that is stored in the OTP region.

3. The memory system of claim 1, wherein the validation control component stores the lifespan information and header information in the initial bad block, the header information indicating that the lifespan information is valid information.

4. The memory system of claim 1, wherein the validation control component further copies the lifespan information to another initial bad block when copying the lifespan information to the initial bad block.

5. The memory system of claim 1, wherein the validation control component stores information regarding a firmware upgrade count in the initial bad block, the information regarding the firmware upgrade count indicating the number of times that the firmware is upgraded.

6. The memory system of claim 1, wherein the lifespan information includes program/erase (P/E) cycle information of the memory blocks.

7. An operating method of a memory system including a nonvolatile memory device comprising a system region for storing lifespan information of a plurality of memory blocks and an one-time programmable (OTP) region, the OTP region storing a location of an initial bad block causing errors in data stored therein, comprising the steps of:

configuring, by a controller, an interface to receive new firmware for upgrade;
identifying, by the controller, the location of the initial bad block stored in the OTP region after the interface receives new firmware;
copying, by the controller, the lifespan information from the system region to the initial bad block at the identified location;
upgrading, by the controller, the firmware after copying the lifespan information; and
copying the lifespan information from the initial bad block to the system region after the upgrade,
wherein the system region is reset by the upgrade, and the initial bad block and OTP region are not reset by the upgrade.

8. The operating method of claim 7, wherein the selecting of the initial bad block comprises:
searching initial bad block information stored in the OTP region; and
selecting the initial bad block from among the initial bad blocks based on the initial bad block information.

9. The operating method of claim 7, wherein the selecting of the initial bad block comprises:
searching initial bad block information stored in the OTP region and priority information of the initial bad blocks; and
selecting the initial bad block from among the initial bad blocks based on the initial bad block information and the priority information.

10. The operating method of claim 7, wherein the copying up of the lifespan information from the system region to the initial bad block comprises storing the lifespan information and header information in the initial bad block, the header information indicating that the lifespan information is valid information.

11. The operating method of claim 7, wherein the lifespan information comprises program/erase (P/E) cycle information of the memory blocks in the nonvolatile memory device.

12. The operating method of claim 7, further comprising storing, by the controller, information regarding a firmware upgrade count in the initial bad block, the information regarding the firmware upgrade count indicating the number of times that the firmware is upgraded.

13. A memory system comprising:
a nonvolatile memory device including a plurality of memory blocks, a first region for storing lifespan information of the plurality of memory blocks and a second region for storing initial bad block information regarding initial bad blocks among the plurality of memory blocks; and
a controller configured to:
when new firmware for upgrade is received, select an initial bad block among the initial bad blocks based on the initial bad block information;
back up the lifespan information from the first region to the initial bad block;
upgrade firmware using the new firmware after backing up the lifespan information; and
copy the lifespan information from the initial bad block to the first region after the upgrade,
wherein the first region is reset by the upgrade, and the initial bad block and the second region are not reset by the upgrade.

* * * * *